SAMUEL W. HARRIS.

Improvement in Furnaces for Smelting Iron and other Ores.

No. 5,397. Reissued May 6, 1873.

Witnesses:
Fred Haynes
R. R. Rabeau

Samuel W. Harris
per A. M. Comb
Attorney

THE NORRIS PETERS CO., PHOTO-LITHO., WASHINGTON, D. C.

UNITED STATES PATENT OFFICE.

SAMUEL W. HARRIS, OF HUDSON, NEW YORK, ASSIGNOR OF PART INTEREST TO BENJAMIN RAY, MILTON MARTIN, AND JACOB W. HOYSRADT.

IMPROVEMENT IN FURNACES FOR SMELTING IRON AND OTHER ORES.

Specification forming part of Letters Patent No. 123,894, dated February 20, 1872; reissue No. 5,397, dated May 6, 1873; application filed June 14, 1872.

*To all whom it may concern:*

Be it known that I, SAMUEL WASHINGTON HARRIS, of Hudson, in the county of Columbia and State of New York, have invented Improvements in Furnaces for the Smelting of Iron and other Ores, of which the following is a specification:

This invention relates to what are commonly known as "blast-furnaces," in which a hot blast is used. It has for one of its objects the economy of the gases evolved in the smelting process, and their conduct in a cold dead state, by proper channels, to any desired place or places where they are to be used for heating the pipe-ovens or steam-boilers, or for illuminating and other purposes. Other objects of it are, economy of fuel, increased production and improved quality of the metal and the regulation of its quality, and increased durability of the upper part of the furnace. The improvement consists in providing the top of the furnace, above an opening or openings provided for the exit of the gases to the place or places where they are to be utilized, with a cover having one or more charging-apertures for the introduction of the ore, fuel, and flux into the furnace, and with swinging doors for closing the said aperture or apertures, and thereby preventing the escape of the gases by said aperture or apertures after charging, such cover being also provided with an opening of suitable size for the escape of any surplus gas, with a damper to regulate such escape.

As the invention is more particularly applicable to blast-furnaces for the smelting of iron ores, it will be more particularly described with reference to the smelting of those ores, though its mode of application would be the same for the smelting of other ores.

Figure 1:
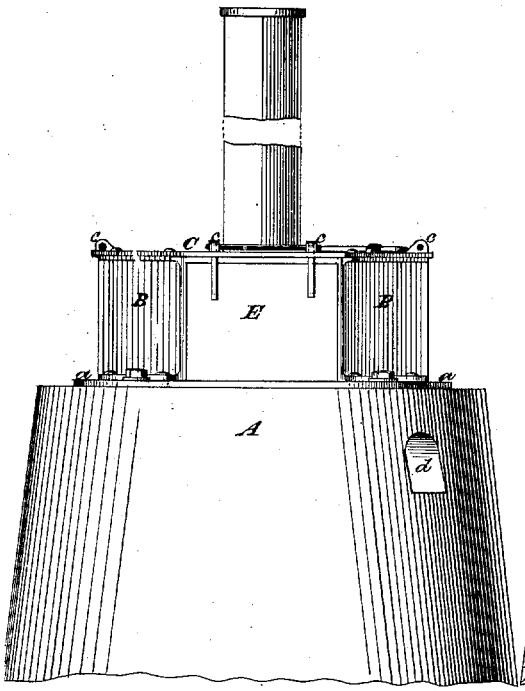
Figure 2:
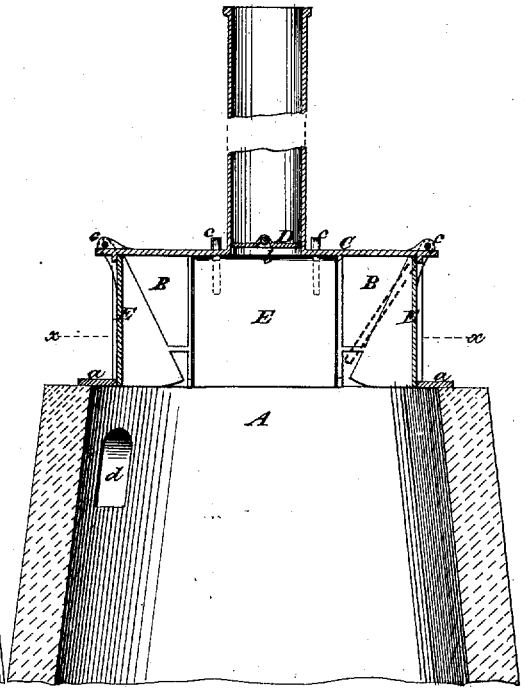
Figure 3:
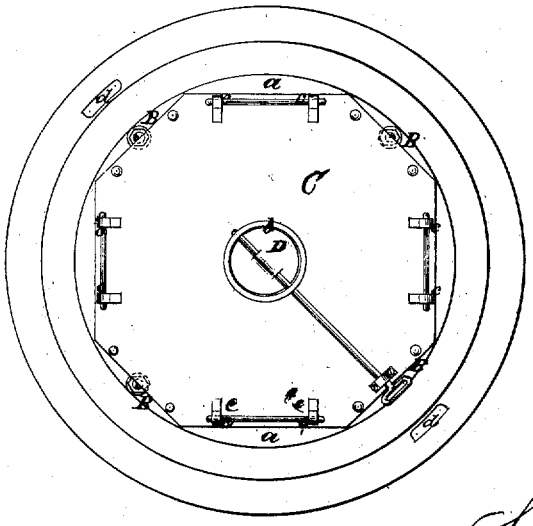
Figure 4:
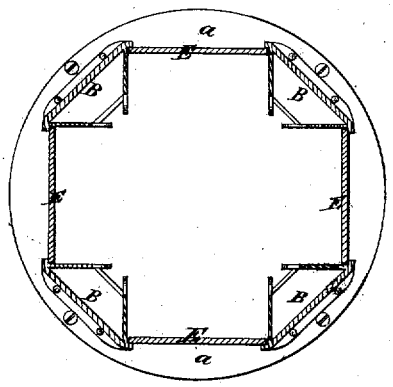

Figure 1 in the drawing is a side view of the upper part of an ordinary blast-furnace having the invention in one of its forms or modifications applied. Fig. 2 is a central vertical section of the same. Fig. 3 is a plan of the same, and Fig. 4 is a horizontal section in the plane indicated by the line *x x* in Fig. 2.

Similar letters of reference indicate corresponding parts in the several figures.

A represents the upper part of the blast-furnace, and *a* the treenail-head plate. On that plate, at the edge of the furnace-mouth, there are erected iron stanchions B B, which support an iron plate, C, made in one or more pieces, of polygonal form, and in the center of which is an opening, *b*, fitted with a damper, D. Between the stanchions B B are iron doors or shutters E E, hung on hinges *c c* at their upper edges from the above-mentioned plate C, such doors resting, when in place, against the interior surfaces of the stanchions, at or close to the edges thereof, and thereby effectually serving to close the spaces between the stanchions.

The stanchions, the top plate, the hinged doors, and the damper form a complete cover, closing the mouth of the furnace, but having openings capable of being easily exposed for introduction of the ore, fuel, or flux into the furnace, and which are closed after charging to prevent escape of the gases by them. At a short distance below this cover there are provided in the sides of the furnace one or more openings, *d d*, whence the gases from the furnace are conducted by ducts to the place or places where they are to be used.

In charging the furnace with fuel, ore, or flux, the barrow conveying it is pushed against either of the doors or shutters E E, causing the latter to open by swinging inward, and allowing the contents of the barrow to be dumped into the furnace. The door, afterward being allowed to swing back by its own weight, pushes back the barrow and closes the opening between the stanchions, thereby preventing any further escape of gas than is unavoidable during the very short intervals actually occupied in depositing the ore, fuel, and flux, or than it is desirable to let escape by the opening *b*.

By this invention not only are the gases prevented from escaping, and conducted in a cold dead state to the place or places where they are to be used, but the destruction of the top of the furnace is prevented, and, besides the saving of fuel effected, an increased production and improved quality of metal are obtained. The quality of the metal can also be regulated by closing the damper D to prevent any escape of gases, or by opening it more or less to permit of a greater or less escape; a softer iron being produced by increasing the escape at the opening *b* and allowing a greater quantity to pass to the blast ovens, and a harder iron being produced by increasing the escape at *b* and allowing less to pass to the ovens. The change from making soft to making hard iron, or vice versa, by thus varying the escape can be made in six hours, instead of occupying three or four days, as with the method ordinarily practiced in blast-furnaces.

The invention can be applied to any furnace previously in use while it is "in blast," without requiring any blowing out for the purpose.

The doors or shutters herein described, by way of illustrating a means of carrying the invention into effect, instead of being arranged to close in vertical positions, as shown, may be arranged to close at an inclination; and instead of being constructed and arranged to close by their own weight, may have weights applied to them, in any suitable or convenient manner, to produce or assist their closing; or they could be arranged and operated with levers and counterweights to rise and fall or open and close.

The outlet *b*, for the escape of the surplus gases, may be provided with an escape-pipe of any convenient height.

*Claims.*

1. The cover applied to the head of a blast-furnace, and provided, substantially as herein described, with one or more charging-apertures and swinging doors for closing the same.

2. The escape-opening *b* and regulating-damper, in combination with the cover and its opening and closing charging-apertures, substantially as and for the purpose herein described.

SAMUEL WASHINGTON HARRIS.

Witnesses:
ABRAHAM S. PEET,
RICHARD MACY.